United States Patent [19]

Foust

[11] Patent Number: 5,429,286
[45] Date of Patent: Jul. 4, 1995

[54] CART SECURING APPARATUS

[76] Inventor: Victor K. Foust, 5 Timberview Pl., Kaw City, Okla. 74641

[21] Appl. No.: 205,787

[22] Filed: Mar. 4, 1994

[51] Int. Cl.⁶ .............................................. B60R 9/048
[52] U.S. Cl. ............................ 224/42.38; 224/42.32; 224/42.4; 224/403; 224/570; 224/571; 248/503; 410/3
[58] Field of Search ................ 224/42.12, 42.32, 42.38, 224/42.39, 42.4, 42.45 R, 273; 248/499, 500, 503, 510; 280/767, 769, 423.1; 410/3, 9, 19, 22

[56] References Cited

U.S. PATENT DOCUMENTS

| | | | |
|---|---|---|---|
| 1,500,511 | 7/1924 | McKenney | 224/42.38 |
| 3,364,535 | 2/1966 | Metcalf | 24/263 |
| 4,281,950 | 8/1981 | Lehman et al. | 410/3 |
| 4,580,935 | 4/1986 | Treihaft | 410/3 |

Primary Examiner—Henry J. Recla
Assistant Examiner—Peter S. Hrycko

[57] ABSTRACT

An apparatus for securing a cart to the bed of a vehicle such as a truck or trailer consists of a first clamping apparatus having a top and a bottom. The top is formed into a "U" shape while the bottom is formed into an "L" shape. The bottom has an opening through which a bolt is inserted which passes into the bed of the truck to secure the first clamping apparatus to the truck. The Cart has an axle which is attached to a pair of wheels. The first clamping apparatus "U" shaped end is adapted to mate with the cart axil. A second clamping apparatus is attached to the bed of the vehicle. The second clamping apparatus has a central locking portion and has a handle attached to the locking portion. An end portion is likewise attached to the end portion so that when the handle is lifted, for example, the clamp will be unlocked and the end portion will be lifted. When the handle is lowered, the end portion will also be lowered with the clamp in a locking position. The end portion has an end configured to pass over a rear portion of the cart clamping the cart in a secured position on the vehicle bed, keeping the cart from forward, rearward, up or down, forward or rearward movement during transportation.

4 Claims, 4 Drawing Sheets

CART SECURING APPARATUS

BRIEF DESCRIPTION OF THE INVENTION

This invention relates to an apparatus for securing a cart to a flat bed such as a truck bed to prevent movement of the cart when the truck bed is moved forward or backward. Further, the apparatus will contain the cart form being dislodged by bouncing of the bed or turning of the bed. The invention basically comprises a first clamping apparatus attached to the bed. The first clamp includes arcuate members which are contoured to conform to the radius of the cart axil. The cart is then pushed forward on the bed until the front axle is mated with the first arcuate members. A second clamp is also attached to the bed and comprises a releasable clamp with a second member configured to secure a leg portion of the cart to the bed. Once the second clamp is secured around the leg portion, the cart is secure from movement in a forward, backward, up, down or rotational movement.

BRIEF DESCRIPTION OF THE PRIOR ART

Prior to this invention, the cart was pushed onto the bed of a truck, for example, and wedged by boards or other external members in a manner to try to prevent the cart from moving during transportation. Since these carts can weigh nearly one hundred pounds, any external members were inadequate to lock the cart in place.

DETAILED DESCRIPTION OF THE INVENTION

Figure 1:
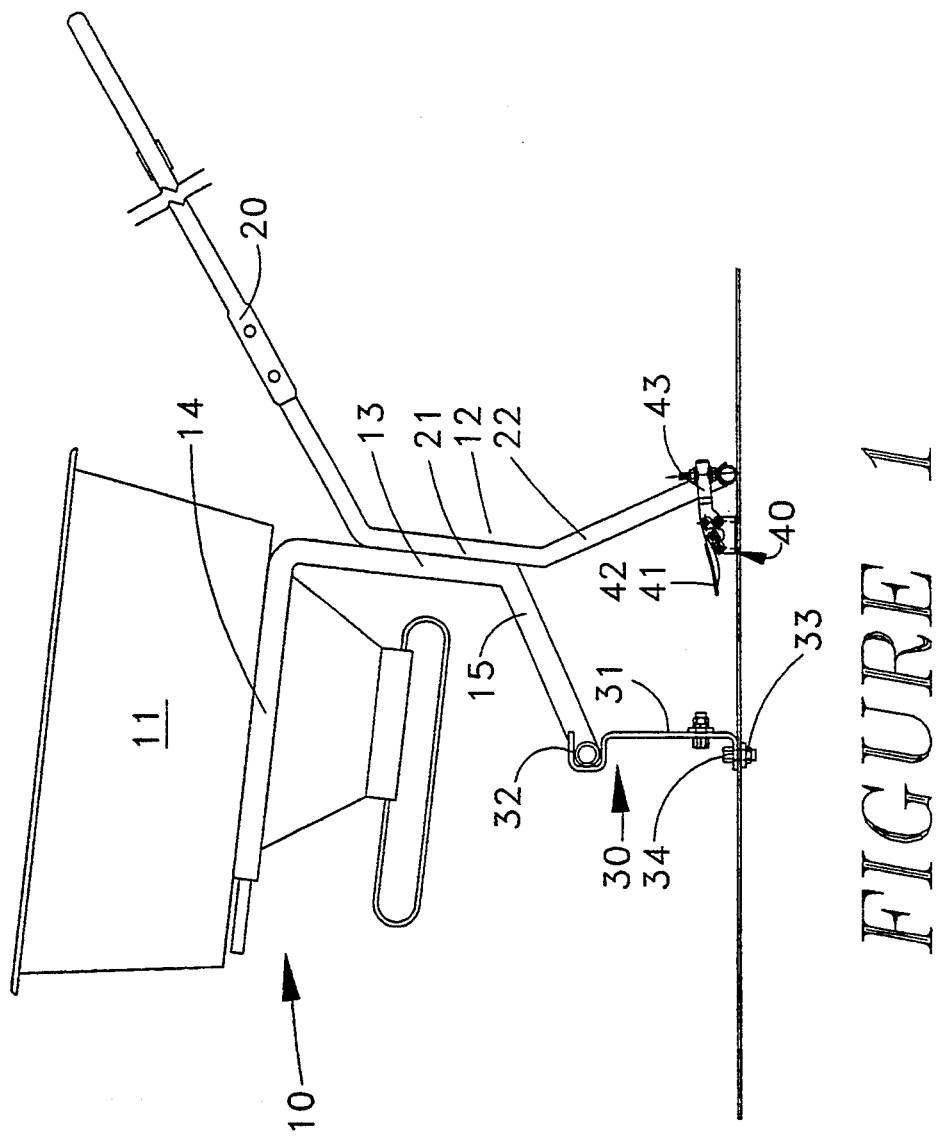
FIG. 1 is a side view of a cart which is clamped to a deck using the novel clamps of this invention.

Referring to all the Figures but in particular to FIG. 1, a cart 10 has a material bin 11 attached to a support frame referred to by arrow 12. Support frame 12 generally consists of a bin support member 13 which is substantially in the configuration of a "U" with the upper portion of the upper arm. 14 supporting bin 11 and a lower arm 15 supporting an axle 16 through a bearing 17 (see FIG. 2). A pair of wheels 18 are rotatably attached to axle 16 in the usual manner.

In order to push and support the cart, a handle 20 is attached through a member 21 to bin support member 13. A stabilizing member 22 is attached to member 21 for supporting the cart against the ground or truck bed 23. Stabilizing member 22 also has a cross member 24 which attaches the end of member 22 to a mating member 22a on the opposite side of bin 11. All members described with respect to FIG. 1 are duplicated on the other side of bin 11 with the exception of cross member 24 and an interconnecting portion for handle 20, (see FIG. 2). Handle portions 20 and 20a have extensions 25 and 25a which are attached to each other by means of welds or screws to strips 26 and 27. The entire cart as above described is well known in the art and is routinely used in the distribution of fertilizer in the garden industry.

The biggest problem with such a cart is that it is generally loaded with fertilizer and loaded on the bed of a truck for transportation to a site. The cart when loaded, is very heavy and will move quite readily in the back bed of the truck causing damage to the other supplies in the truck, or the cart itself may spill if tipped over during transport. This invention is directed toward a means of solving the transportation of such a cart in the back of a truck, trailer or the like. This invention generally consists of an apparatus for securing such a cart to the bed of a truck or trailer.

Figure 2:
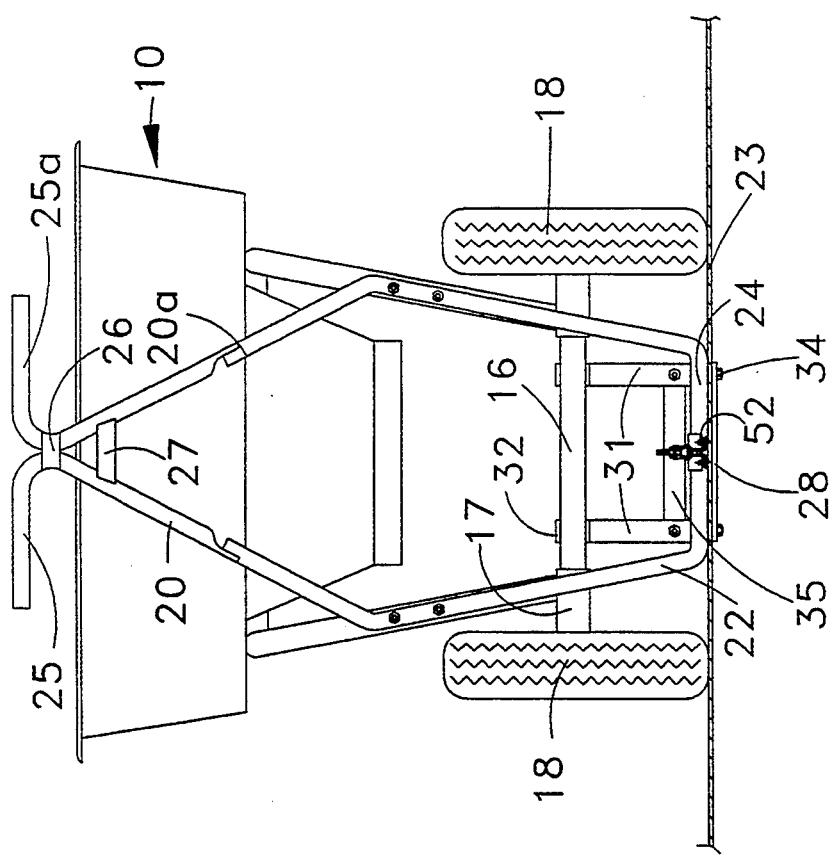
FIG. 2 is an end view of a cart which is clamped to a deck using the novel clamps of this invention.
Figure 3:
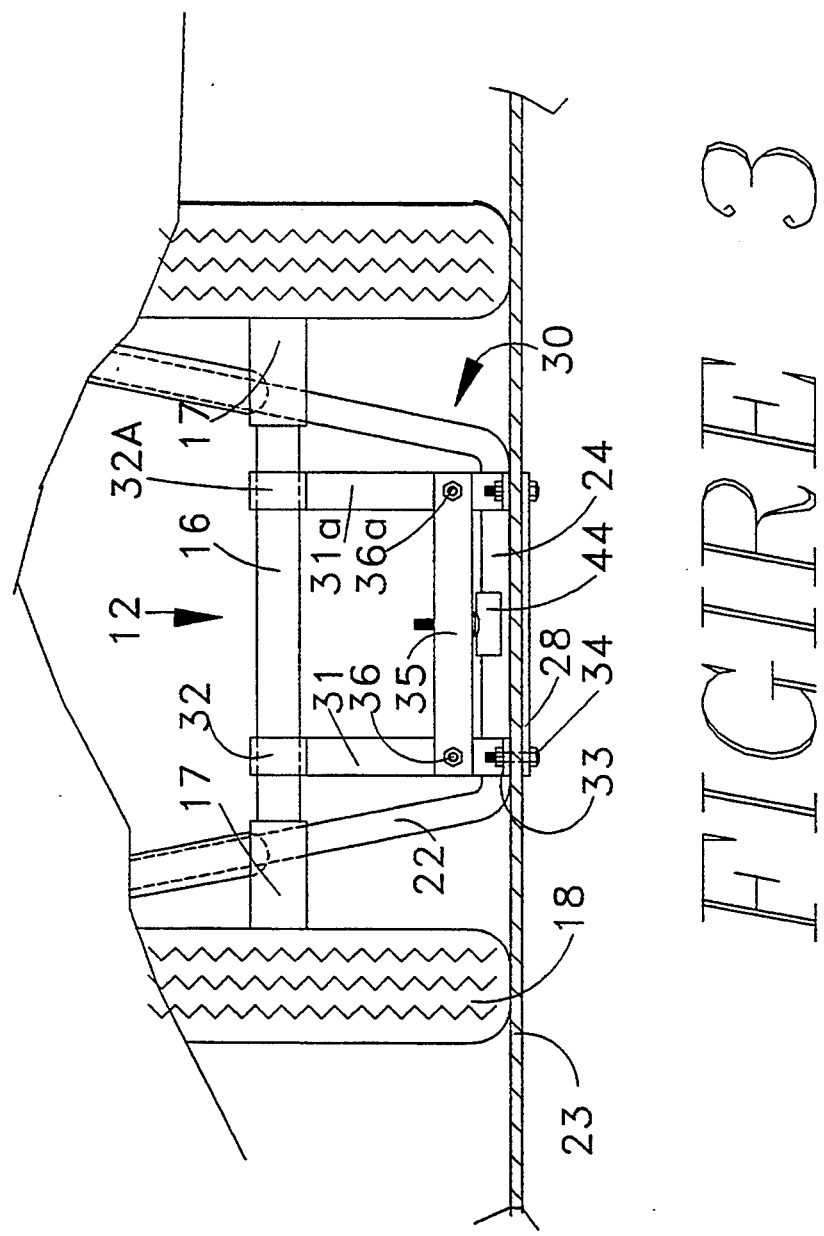
FIG. 3 is a partial section of a front view of the cart and clamps of FIG. 2, with the rear cart support and rear clamp removed.

Referring to FIG. 1 and FIG. 2 in particular, an axle engaging member generally referred to by arrow 30. Axle engaging member 30 consists of a first and second upright clamp 31 and 31a respectively. Only one clamp 31 will be specifically described since damp 31a is identical having an upper end 32 which is formed in the configuration of a "U". The "U" is sized to mate with axle 1. 6 and surround a portion of axle 16 in a manner to secure axle 16 from movement either toward the "U" or up or down, thus completely locking the axle in every direction but out of the "U". The lower end of axle engaging member 30 has an "L" shaped portion 33 so that member 31 can be bolted or welded to bed 23 of a truck or trailer by means of bolt 34. An under support plate 28 adds additional strength to the bed 23 of a vehicle or truck to which the axil engaging means 30 is attached by bolts 34. Referring to FIGS. 2 and 3, two axle engaging members, 30 are utilized and are spaced apart to give stability to anchored can 10. In order to stabilize axle engaging members 30 against side movement, making it difficult to engage axle 16 therein, a cross member 35 (see FIG. 3) is attached between upright member 31 and 31a. Bolts 36 and 36a are secured to upright members 31 and 31a to further stabilize the movement of members 31 and 31a from rotational movement about bolts 34. It is obvious that if "L" shaped portions 33 are welded, then cross member 35 would not be needed.

Figure 5:
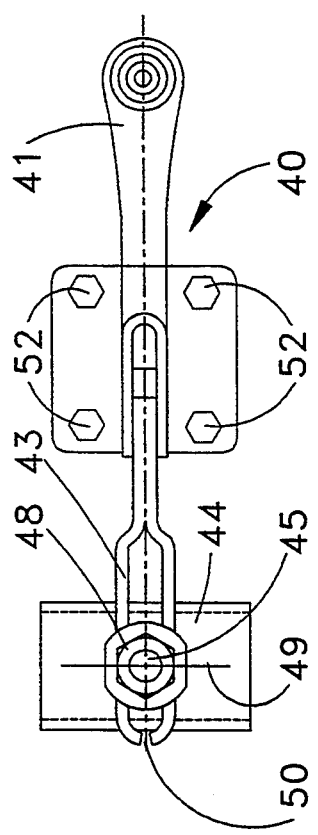
FIG. 5 is a top view of the clamping apparatus illustrated in FIG. 4.
Figure 4:
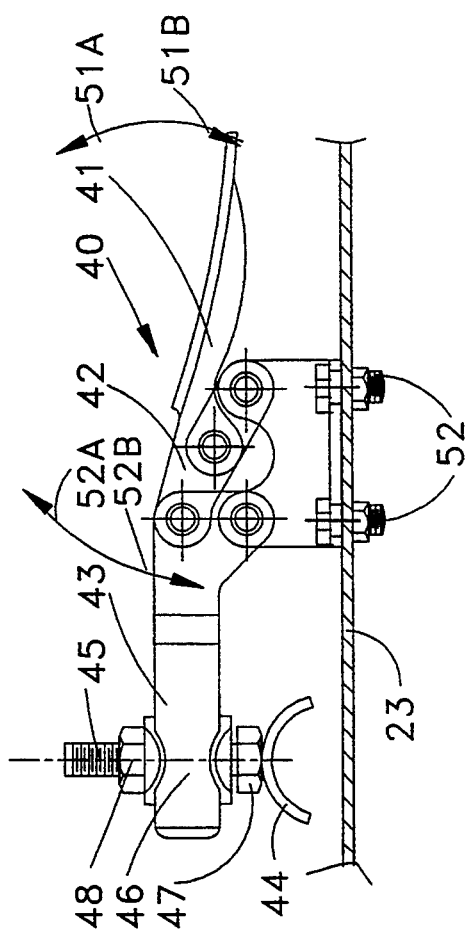
FIG. 4 is a side view of the clamping apparatus.

A locking assembly generally referred to by arrow 40 is a snap lock well known and available, and is generally known as a DESTACO (TM of Destaco Co.) SS-215-U locking assembly manufactured and available from Destaco Company. The Clamp or snap lock essentially comprises a handle 41, locking portion 42, and end portion 43. End portion 43 has attached thereto a tube portion 44 which has been cut along its length to form a arcuate portion 44. A bolt 45 is radially attached to the center outer circumference of tube portion 44. Bolt 45 passes through an opening 46 illustrated by dotted lines, and is secured by nuts 47 and 48 in a manner to secure arcuate or tube portion 44 so that its axis 49 (see FIG. 5) is transverse to the centerline 50 of clamp 40. Clamp 40 is designed so that when handle 41 is moved in the direction of arrow 51 a that the end portion 43 moves in the direction of arrow 52a and visa versa.

Operation

The cart securing apparatus operates in the following manner. Upright clamps 31 and 31a are located on the bed of a truck or trailer, for example, so that there is room for the placement of cart 10 on the bed. Upright clamps 31 and 31a are then bolted to the bed by bolts 34 spacing clamps 31 and 31a so that cross member 35 can be attached to upright members 31 and 31a by means of bolts 36. It is obvious that the upright members can be attached to cross member 35 before installation onto bed 23. Cart 10 is then lifted onto the truck bed and its axle 16 is inserted in to "U" shaped ends 32. Clamp 40 is then positioned over cross member 24 so that arcuate tube portion 44 is mating with cross member 24. Clamp 40 is then attached to the bed of the truck or trailer 23 by means of a plurality of bolts 52. Clamp 40 can face either direction with the handle 41 facing axle engaging means 30 or facing away from axle engaging means 30. In either position, clamp 40 will retain cart 10 securely against upright clamps 31.

To clamp the cart 10 on bed 23, cart 10 is lifted onto bed 23 and moved forward until axle 16 engages "U" shaped end 32. Clamp 40 has had its handle 41 in the raised position in the direction of arrow 51a. Once cart 10 is against "U" shaped ends 32, clamp handle 41 is lowered in the direction of 51b to cause portion 43 to lower in the direction of arrow 52b to engage arcuate or tube portion 44 against cross member 24 rigidly securing cart 10 tightly against "U" shaped portions 32 and 32a. The cart is released in the opposite manner, handle 41 is raised causing arcuate member 44 away in the direction of arrow 52a from cross member 24. Cart 10 is then free to move away from "U" shaped portions 32 and 32a permitting cart 10 to be freely removed from bed 23.

Clamp 40 is preferred to be mounted with the handle 41 facing axle engaging means 30 since the can would not need do be lifted over clamp 40. Further, arcuate or tubular portion should be made to configure to the shape.

Conclusions

A novel clamping arrangement has been described for anchoring a cart such as that used for spreading fertilizer, to the bed of a truck or trailer, for example. The apparatus is easy to install since it consists of only a forward axle engaging apparatus and a rearward clamping apparatus. Yet once clamped, the cart is in an extremely rigid position against bouncing, rotating during turns by the vehicle, and forward and backward movement when the vehicle is accelerated or decelerated.

What I claim is:

1. An apparatus for rigidly clamping a wheeled cart having an axle attached to said wheels on one end and a horizontal cross member for supporting said cart at its other end, to the bed of a truck or trailer comprising:
    a. first clamping means adapted to be attached to said bed, said clamping means having "U" shaped means at one end for securing said axle, and means at its other end for securing said clamping means to said bed;
    b. second clamping means, including handle means, locking and releasing means attached to said handle means, second clamping means attached to said locking and releasing means and means for securing said second clamping means to said bed, said second clamping means including a securing means having a configuration adapted to pass over said horizontal cross member in a manner so that when said handle means is depressed, said securing means will depress against said horizontal cross member clamping said horizontal cross member against said bed;
    whereby said first clamping means will prevent the wheel portion of said cart from movement in any direction but rearward, and said second clamping means will clamp said cart against rearward movement.

2. Apparatus as claimed in claim 1 wherein said first clamping means includes a first and second support member, each support member having on its first end a "U" shaped end for engagement with said axle and on its second end an "L" shaped end for attachment to said bed.

3. Apparatus as described in claim 2, wherein said clamp includes a cross member rigidly coupled between each of said first and second support members and between said first and second ends.

4. Apparatus as claimed in claim 1, wherein said second clamping means is adapted to be attached to said bed with said handle means facing said first clamping means.

* * * * *